(No Model.)

E. T. STARR.
ELECTRIC MOTOR.

No. 302,793. Patented July 29, 1884.

WITNESSES:
Nellie Holmes
Eugene V. Brown

INVENTOR:
Eli T. Starr,
by his atty's
Baldwin Hopkins & Peyton

UNITED STATES PATENT OFFICE.

ELI T. STARR, OF PHILADELPHIA, PENNSYLVANIA, ASSIGNOR TO THE S. S. WHITE DENTAL MANUFACTURING COMPANY, OF SAME PLACE.

ELECTRIC MOTOR.

SPECIFICATION forming part of Letters Patent No. 302,793, dated July 29, 1884.

Application filed January 23, 1884. (No model.)

*To all whom it may concern:*

Be it known that I, ELI T. STARR, of the city and county of Philadelphia, in the State of Pennsylvania, have invented certain new and useful Improvements in Electric Motors and their Connections, of which the following is a specification.

My invention relates to electric machines known as "electric motors," whereby electrical energy is utilized for useful mechanical work; and its objects are to provide simple and effective means whereby the speed and power and the direction of revolution of the revolving parts of the motor may be regulated, controlled, and determined with ease and nicety.

To these ends my invention consists in certain new organizations of parts and new combinations of devices, which are particularly recited at the close of the specification, a detailed description of my improvements as embodied in the best way now known to me being given herein before the summing up of the subject-matter claimed, which, as stated, concludes this specification.

Some of my said improvements or new combinations and organizations may be used without the others, and in machines differing from that herein particularly described in detail.

Figure 1:
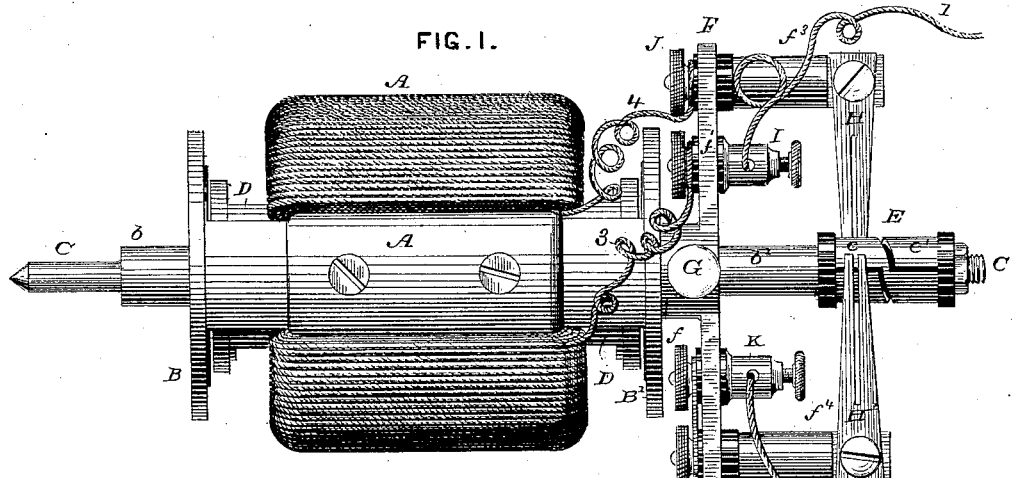
Figure 2:
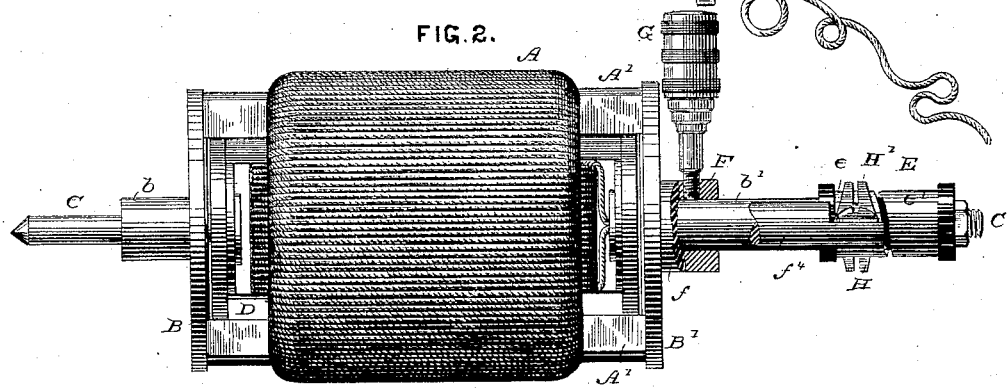
Figure 3:
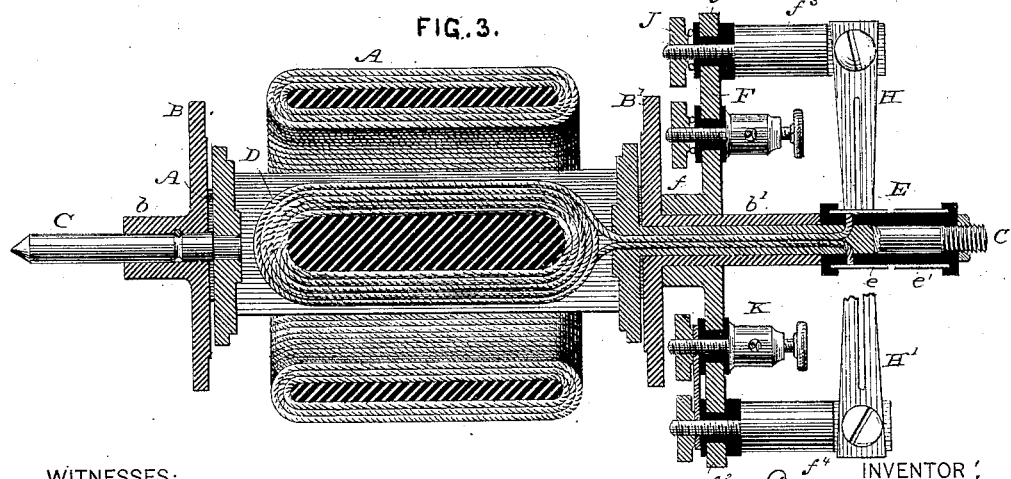

In the accompanying drawings, which illustrate so much of an electric motor having my improvements applied thereto as is necessary to illustrate the subject-matter claimed, Figure 1 is a view in elevation of the improved motor and its connections. Fig. 2 is a view thereof at right angles with Fig. 1, and with a portion of the devices broken away to show the construction of the remaining parts more clearly, and Fig. 3 is a vertical longitudinal section through the apparatus.

In the present example the field-magnet A is provided with two pole-pieces, A' A', the ends of which are fastened to end plates, B B', to constitute the frame of the motor. Said end plates, B B', are fitted with journal-bearings $b$ $b'$, to receive the shaft C of the armature D, said shaft being fitted to turn in the bearings in the frame of the motor, and being provided at one end with suitable driving-connections by which to communicate power or motion in the production of useful work. These driving-connections are not shown, as they form no part of the present invention. The end plate, B', is provided with a cylindrical tubular extension, $b'$, which constitutes the bearing of said plate for the front end of the armature-shaft C. Said front end of the armature-shaft is extended through the prolonged cylindrical bearing $b'$, and carries upon its end the commutator E, which is carried by and revolves with said armature-shaft when the motor is in motion.

The armature D, shown in the drawings, is the well-known Siemens H armature, and, like the field magnet or magnets, needs no particular description herein, as their construction and operation are well understood.

The commutator E consists of two spiral plates, $e$ $e'$, which are fitted to the end of the armature-shaft and insulated therefrom, the said plates $e$ $e'$ being nicely fitted to and secured upon the armature-shaft by means of insulated hard rubber caps or nuts, for example. In other words, the commutator E is divided longitudinally and vertically, so as to form two separate plates insulated from one another, as clearly shown in the several figures of the drawings. The wire of the armature D is connected at its ends to the divided spiral plates $e$ $e'$ of the commutator—that is to say, one end of the wire is electrically connected to one of said commutator-plates, and the other end of the wire to the other of said commutator-plates.

A frame, F, is provided with a hub, $f$, and is fitted upon the cylindrical extension $b'$ of the motor-frame, and has the capability of turning around said extension $b'$, or of being moved longitudinally thereon, and of being locked in its adjusted position, the purpose of which will presently appear. The hub $f$ of said frame F is provided with a threaded socket or opening, in which the reduced threaded end of a lever or handle, G, works. When said lever G is loosened in the threaded socket of the hub $f$, the frame F may be adjusted freely upon the extended portion $b'$ of the motor-frame, while, when tightened or screwed up, its inner end comes in contact with or impinges upon the surface of said extension $b'$ and locks the frame firmly in its adjusted position. Said frame F is provided with two oppositely-extending arms, $f' f^2$, the outer ends of which are fitted with insulated brush-arms $f^3 f^4$, and to these brush-arms the commutator-brushes H H' are secured, so that the free ends of said brushes bear upon the commutator E of the armature D, as clearly shown in the drawings, and with the capability in said brushes of being adjusted or turned around upon said commutator, as well as of being moved or adjusted endwise thereon.

By mounting the commutator-brushes upon the frame F the said brushes can be so adjusted relatively to said commutator as to vary the power and speed of the motor, as will be obvious, for the reason that by adjusting the brushes around the commutator the current flowing over the circuit can be graduated in its action upon the motor; or, in other words, the current can be broken and its action upon the motor reversed at any desired point. For instance, instead of allowing the full pull of the poles of the field-magnet upon the armature, the extent of the pull, as well as the pushing or repelling action of the magnets, can be graduated at will. By the same mechanism also the motion of the armature may be controlled.

The commutator-brushes, as clearly shown in the drawings, bear upon the respective plates $e\ e'$ of the commutator, and when the current is flowing over the circuit, including the motor, its rotation will be in one direction, while if the brush-carrying frame F be adjusted outwardly it will be obvious that the brushes are shifted so as to bear upon different plates, and thereby the direction of motion of the armature will be reversed, as is perfectly obvious to those familiar with the action of electro-magnetic motors. The current in this instance flows from a suitable source of electrical supply or generator over the line-wire 1, through the binding-post I, by way of wire 3, to the coils of the field-magnet, and from thence by way of wire 4 to the binding-screw J. From said binding-screw J the current flows through the brush-arm $f^3$ to the brush H, through the commutator-plate $e$, over the armature-coil, and back to the opposite commutator-plate, $e'$, and from thence through the brush H' and brush-arm $f^4$ to the binding-screw K, and from said binding-screw to the generator or source of electrical supply.

It will thus be seen from what has been said that by a single adjusting device not only the power and speed of the motor are controlled, but also its direction of rotation, which is very desirable, the single lever being employed to attain these results. The motor is therefore under the perfect control of the operator, who can graduate the power to be delivered by the motor at will, and also reverse it as desired.

Having thus described my invention, what I claim herein is—

1. The combination, with the commutator of an electric motor, of commutator-brushes adjustable circumferentially and longitudinally relatively to said commutator, substantially as described.

2. The combination, with an electric motor and its armature-shaft carrying a commutator, of a turning and endwise movable frame carrying the commutator-brushes, substantially as described.

3. The combination, with an electric motor and its armature-shaft carrying the commutator, of a turning and endwise movable frame carrying the commutator-brushes, and a locking device, whereby said frame may be secured in its adjusted position.

4. The motor-frame provided with an extended cylindrical portion, in combination with a brush-carrying frame fitted to turn about and move endwise on said extended portion of the motor-frame, and a locking device to secure said brush-carrying frame in its adjusted position, substantially as described.

In testimony whereof I have hereunto subscribed my name this 18th day of January, A. D. 1884.

ELI T. STARR.

Witnesses:
 J. A. B. WILLIAMS,
 J. W. DE BARGER.